United States Patent
Ang (10) Patent No.: US 6,847,399 B1
(45) Date of Patent: Jan. 25, 2005

(54) INCREASING READOUT SPEED IN CMOS APS SENSORS THROUGH BLOCK READOUT

(75) Inventor: Lin-Ping Ang, Montrose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/274,739

(22) Filed: Mar. 23, 1999

Related U.S. Application Data (60) Provisional application No. 60/079,046, filed on Mar. 23, 1998.

(51) Int. Cl.[7] ............................................. H04N 3/14
(52) U.S. Cl. .................................................. 348/308
(58) Field of Search ............................... 348/302, 304, 348/307, 308, 241, 246, 294; 250/208.1

(56) References Cited

U.S. PATENT DOCUMENTS

| | | | |
|---|---|---|---|
| 4,737,854 A | * | 4/1988 | Tandon et al. ............... 348/241 |
| 4,835,404 A | * | 5/1989 | Sugawa et al. ........... 250/208.1 |
| 5,081,536 A | * | 1/1992 | Tandon et al. ............... 348/246 |
| 5,148,268 A | | 9/1992 | Tandon et al. |
| 5,461,425 A | * | 10/1995 | Fowler et al. ............... 348/294 |
| 5,471,515 A | | 11/1995 | Fossum et al. |
| 5,493,423 A | * | 2/1996 | Hosier ......................... 348/241 |
| 5,550,653 A | | 8/1996 | TeWinkle et al. |
| 5,631,704 A | | 5/1997 | Dickinson et al. |
| 5,739,562 A | | 4/1998 | Ackland et al. |
| 5,841,126 A | * | 11/1998 | Fossum et al. ........... 250/208.1 |
| 5,854,656 A | | 12/1998 | Noggle |
| 6,141,045 A | * | 10/2000 | Tewinkle et al. ............ 348/246 |
| 6,552,324 B1 | * | 4/2003 | Kothari et al. ........... 250/208.1 |

OTHER PUBLICATIONS

Sunetra Mendis, Sabrina E. Kemeny, and Eric R. Fossum, "CMOS Active Pixel Image Sensor," IEEE Transactions on Electron Devices. vol. 41, No. 3, Mar. 1994.

Sunetra K. Mendis, Sabrina E. Kemeny, Russel C. Gee, Bedabrata Pain, Quiesup Kim and Eric R. Fossum, "Progress in CMOS Active Pixel Image Sensors," Proceedings of the SPIE vol. 2172, Charge–Coupled Devices and Solid State Optical Sensors IV (1994).

* cited by examiner

Primary Examiner—Wendy R. Garber
Assistant Examiner—Rashawn N. Tillery
(74) Attorney, Agent, or Firm—Dickstein Shapiro Morin & Oshinsky LLP (57) ABSTRACT

A method and associated architecture for dividing column readout circuitry in an active pixel sensor in a manner which reduces the parasitic capacitance on the readout line. In a preferred implementation, column readout circuits are grouped in blocks and provided with block signaling. Accordingly, only column output circuits in a selected block significantly impart a parasitic capacitance effect on shared column readout lines. Block signaling allows increasing pixel readout rate while maintaining a constant frame rate for utility in large format high-speed imaging applications.

23 Claims, 6 Drawing Sheets

INCREASING READOUT SPEED IN CMOS APS SENSORS THROUGH BLOCK READOUT

CROSS REFERENCE TO RELATED APPLICATIONS

This application claims benefit of U.S. Provisional Application No. 60/079,046, filed on Mar. 23, 1998, which is incorporated herein by reference.

FIELD OF THE INVENTION

The present invention relates to CMOS image sensors, and more particularly to methods and associated architectures for reading out data, from such a sensor.

BACKGROUND

The advent of HDTV and other high-end digital imaging systems is increasing demand for large format high speed sensors. CMOS active pixel image sensors which have low power dissipation, are low cost and highly reliable, and which can typically be configured in a single chip solution, are increasingly being developed for large format high speed imaging applications. Large format sensors usually require an image pixel array of at least 1024×1024 pixels in size. Unfortunately, as the image array is made larger, it becomes difficult to increase pixel readout rate without also increasing frame rate because of parasitic capacitance limitations in current architectures.

SUMMARY

The present disclosure describes a method and associated architecture for dividing column readout circuitry in an image sensor in a manner which reduces the parasitic capacitance on the readout line. In a preferred implementation, column readout circuits are grouped in blocks and provided with block signaling. Accordingly, only column readout circuits in a selected block significantly impart a parasitic capacitance effect on shared column readout lines at any point in time. Block signaling was found to increase pixel readout rate while maintaining a constant frame rate for utility in large format high-speed imaging applications.

In accordance with a preferred embodiment, by mathematically modeling the load capacitance and the effective RC constant seen by any column output stage at a particular time and by using a differentiated derived equation, a desirable optimum number of connections per block as well as a desired number of blocks for a given size of column readout circuits can be easily determined.

DETAILED DESCRIPTION OF THE PREFERRED EMBODIMENTS

Figure 1:
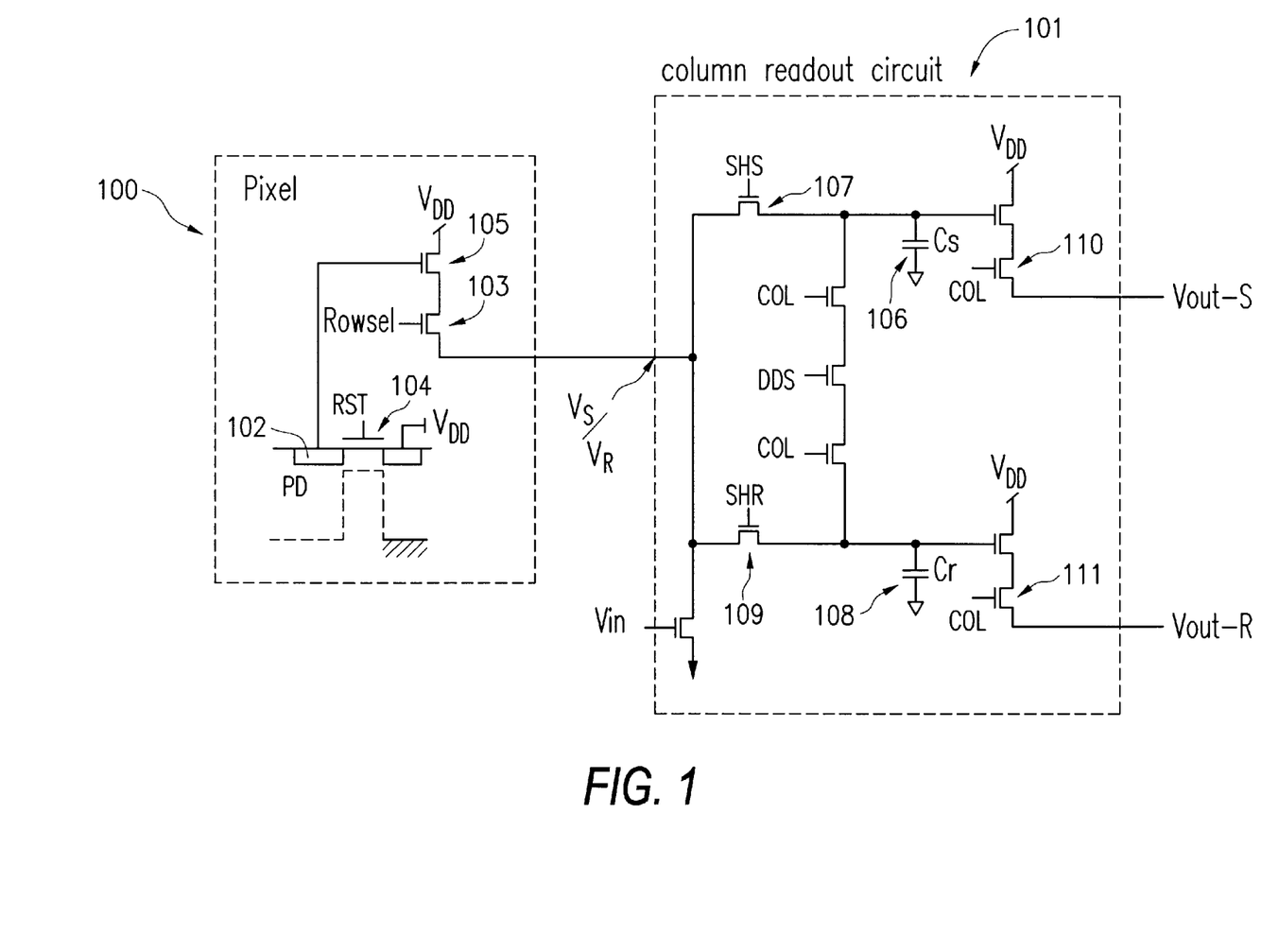
FIG. 1 shows a pixel and corresponding column readout circuit in an active pixel sensor.

A schematic diagram of a conventional CMOS active pixel 100 and associated column readout circuit 101 is shown in FIG. 1. Incident photons on the pixel 100 generate electrons that are collected in the floating diffusion area 102. The charge is buffered by an in-pixel source follower 105. A number of pixels are typically arranged horizontally to form a row of pixels and also vertically to define a column of pixels. Row selection transistor 103 is enabled to allow charge from a given row of pixels to be selectable for readout.

A more detailed discussion of the general principles of pixel readout is provided in U.S. Pat. No. 5,841,126.

While the illustrative implementation shows a photodiode pixel, it should be understood that a photogate, phototransistor or the like could be used instead.

During imaging, the photodiode floating diffusion area 102 is first reset. This is achieved by pulsing a gate of reset transistor 104 to a high voltage, for example VDD. After a period of time, the voltage of the floating diffusion area 102 drops to reflect the number of electrons accumulated in the Floating diffusion area 102. The voltage $V_S$ of the floating diffusion area is then read out from the pixel 100 into the column readout circuit 101 using source follower 105 within pixel 100. Voltage $V_S$ is then sampled onto storage capacitor $C_S$ 106 by enabling the sample-hold signal (SHS) transistor 107.

Figure 2:
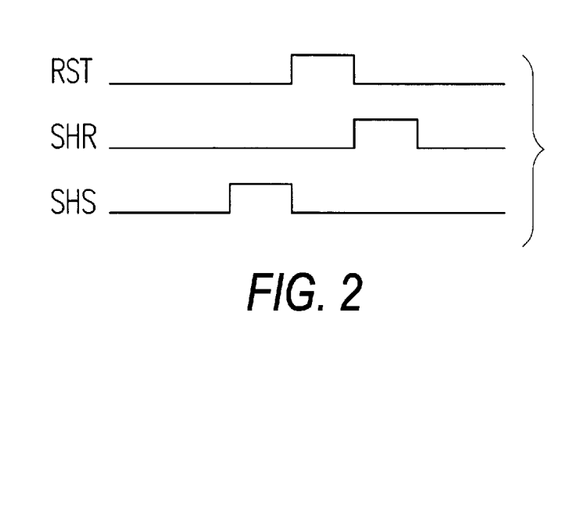
FIG. 2 shows the timing for a photodiode pixel readout operation.

After the signal charge $V_S$ is read out, the pixel 100 is then reset and the gate of reset transistor 104 is again pulsed to a high voltage. The resultant voltage $V_R$ of Floating diffusion area 102 is then read out to the column readout circuit 101 as before. This time the voltage $V_R$ is sampled onto storage capacitor CR 108 by enabling the sample-hold reset (SHR) transistor 109. FIG. 2 shows the timing for the above photodiode operation.

Figure 3:
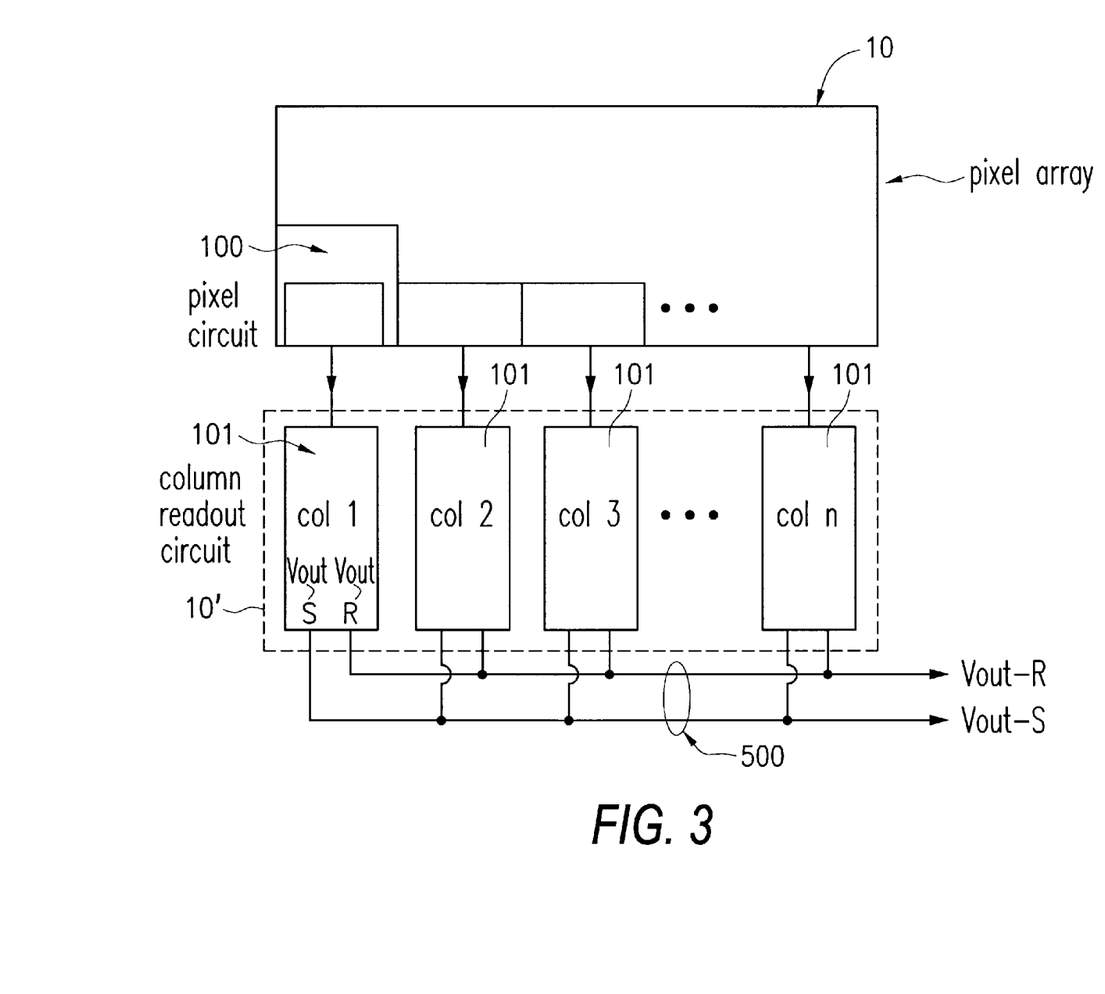
FIG. 3 shows a block diagram of a CMOS active pixel sensor including an array of pixels and corresponding column readout circuits, all coupled to a pair of shared readout lines.

The voltage difference between the voltages stored in the two capacitors, $C_S$ 106 and $C_R$ 108 is indicative of the charge collected in the floating diffusion area 102. Typically, all the pixels 100 in a same row are processed simultaneously. The signals are sampled onto capacitors $C_S$ and $C_R$ in their respective column readout circuits collectively arranged beneath the row (or multiple rows: array 10) of pixels. After a row sampling process is complete, voltage signal Vout_S, Vout_R in each column is read out successively by successively enabling the associated n-channel column selection transistors 110, 111. A high level block diagram of an array of pixels 10 and associated linear array 10' of corresponding column readout circuits 101, arranged in parallel fashion, is shown in FIG. 3. The outputs of Vout_R and Vout_S of column readout circuits 101 each share a common readout line.

Figure 4:
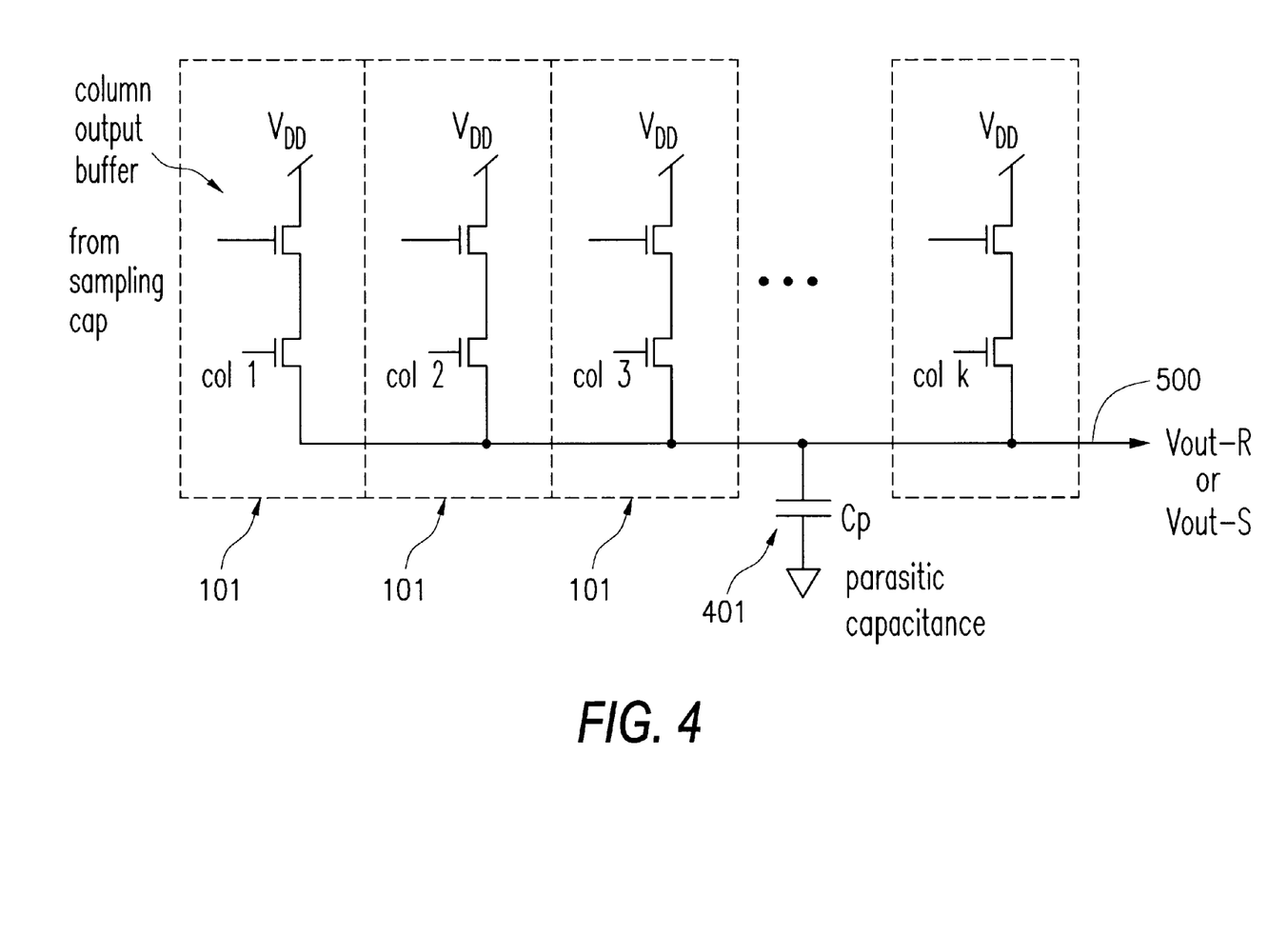
FIG. 4 shows a simplified schematic diagram of a portion of an output stage for each of plural column readout circuits and the parasitic capacitance effects contributed thereby.

FIG. 4 is a simplified partial schematic diagram of the respective output stages of the column readout circuits 101 in a linear array of pixels 10'. Each column output stage contributes a parasitic capacitance resulting in an effective load capacitance of Cp, represented by capacitor 401. Assuming Ci to be the parasitic capacitance contributed by each column circuitry, total parasitic capacitance and total RC time constant (charge and discharge) turn-on/off settling time, may then be represented as follows:

$$Cp1 = mCi \qquad \text{eq. (1)}$$

$$RCp1 = mRCi \qquad \text{eq. (2)},$$

where R is the built-in resistance associated with each of column select transistors 110, 111 in the ON state, and m is the total number of column readout circuits 101 in a column-addressable row.

As explained above, column readout circuit 101 output signals (Vout_S and Vout_R) are each connected to a pair of corresponding shared column readout lines. An image sensor with a horizontal resolution of 1000 pixels could theoretically result in the column output stage of a selected column readout circuit 101 having to drive the load capacitance associated with the other 999 columns. The parasitic capacitance in such a case could effectively be in the tens or even hundreds of picofarads.

A larger capacitance requires longer time to charge the capacitance to a desired voltage value, and results in a greater RC time constant which translates into greater settling time. To increase pixel readout rate at a predetermined maximum frame rate necessarily involves minimizing the effective load capacitance seen by a selected column output buffer (transistor 110, 111).

Settling time may be improved by increasing the biasing current on the column output buffer. The time to charge up a capacitance to a certain voltage is well known and may be represented by the following equation:

$$I_{avg} = C \frac{dV}{dt}$$

$$dt = \frac{C}{I_{avg}} dV$$

Increasing the current would mean more power dissipation since $P_{diss} = V \ast I$. For portable video systems, power dissipation is a key issue because higher power dissipation would reduce the lifetime of the battery. The present inventor has determined this not a desirable or optimum solution.

Figure 5:
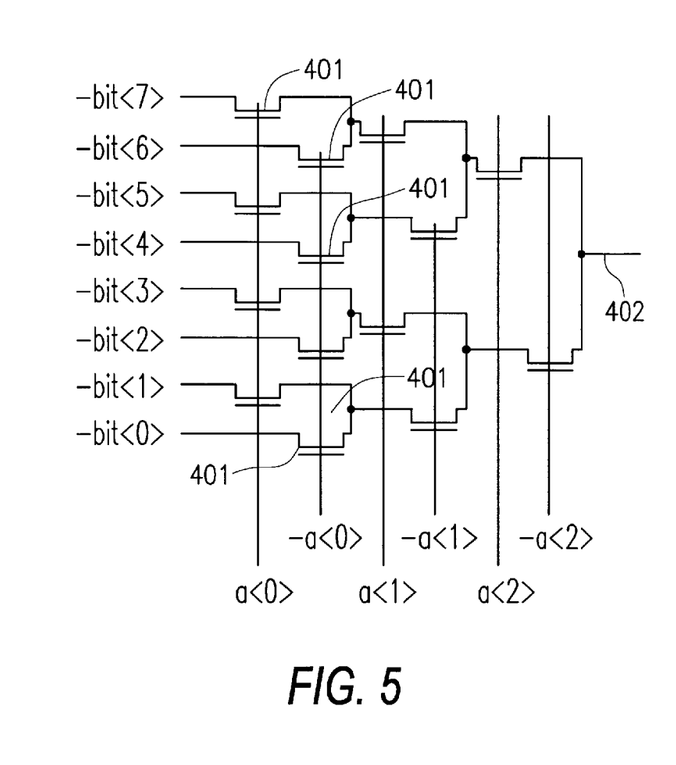
FIG. 5 shows a tree-style column decoder and multiplexer.

Settling time may also be reduced by reducing the effective load capacitance on the column output buffer. A technique for reducing effective load capacitance for faster readout is called tree-style column decoding. An example of a RAM tree-style column decoder and multiplexer is shown in FIG. 5. Data bit lines are coupled to a pool of switches (transistors 401) which are selectively enabled to drive only a desired data bit through to a shared bit line 402. In the configuration shown, a selected bit line receives a parasitic capacitance contribution from at least four transistors. With such a scheme, however, the overall effective capacitance seen on the shared bit line 402 can be reduced by as much as half that which might be imparted were all eight bit lines to be directly coupled to shared bit line 402 by only a single parallel bank of eight transistors.

Tree-style column decoding reduces the effective capacitance seen by each bit output line.

The present inventor has discovered that by splitting the column circuitry into different blocks, as will be explained in greater detail below, the readout bus capacitance seen by a currently selected column output stage could be significantly reduced beyond that possible by known techniques.

In accordance with a preferred embodiment, the load capacitance is mathematically modeled. The effective RC constant seen by any column output stage at a particular time is determined. By using a differentiated derived equation, a desirable optimum number of connections per block as well as a desired number of blocks for a given size of column readout circuits can be easily determined from this equation.

Figure 6:
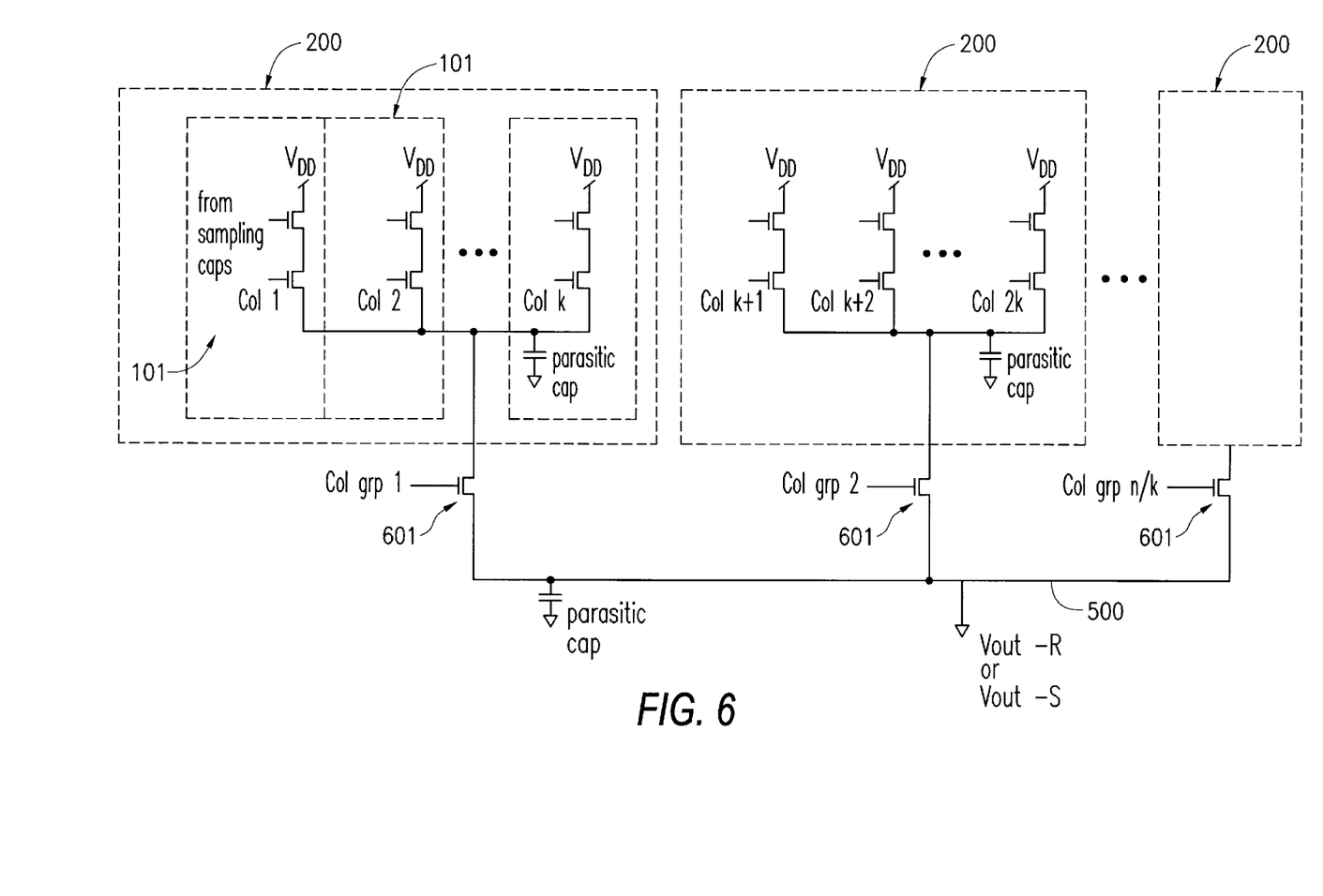
FIG. 6 shows the grouping of column readout circuits in blocks of k across an m-pixel linear array.

An improved configuration for coupling the column output stages resulting in reduced parasitic capacitance effects is illustrated in FIG. 6. FIG. 6 shows the column readout circuits 101. Only one portion of the respective column output stage is shown. These are logically divided up into blocks 200, each comprised of k contiguous column readout circuits. A set of block switches (n channel transistors) 601 are used to select among the blocks 200. Each switch 601 functions as a block select switch allowing the column readout circuits 101 in a given block to become actively coupled to the shared column readout line 500. Block switches 601 are used to select among the blocks 200 every time an associated column readout circuit 101 is to be turned ON. Once a column readout circuit 101 is selected for readout, its corresponding block switch 601 is also selected, but none of the other block switches are selected. Those blocks 200 which are not selected prevent or block associated column readout circuits from imparting a parasitic capacitance on the shared readout line 500, and/or on the column output stage of the currently active column readout circuit.

Block switches 601 also collectively impart a proportionate parasitic capacitance on the currently active column readout circuit, regardless of whether or not they are connected. Thus, in an arrangement of 64-wide block column readout circuits servicing a 1024-pixel wide row, there would be a total 1024/64=8 blocks. Each of the eight block switch transistors 601 would impart a parasitic capacitance of its own. This capacitance of eight transistors, however, is much less than the collective capacitance of 1024 non-blocked column select transistors. In this regard, it might be said that block select switches 601 function as parasitic capacitance blockers.

The present inventor has determined that the optimum number of column readout circuits 101 per block 200 (i.e., the optimum value of k) for a given size pixel configuration may be calculated from the following mathematical quadratic relation, $$C_{p2} = (k + 2 + m/k)C_i, \qquad \text{eq. (3)}$$

for k (n-channel) column select transistors (110 or 111) and m/k groups, where m is the total number of column readout circuits 101. The numeral 2 constant is derived from the parasitic capacitance of the group selection (nmos) transistor of the particular block being selected. This is based on a previous assumption that Ci is the parasitic capacitance of the source/drain diffusion of the nmos selection transistor.

Minimizing $C_{p2}$ in eq. (3) by differentiating $C_{p2}$ with respect to k and equating it to zero, we get:

$$(1 - m/k^2)C_i = 0, \qquad \text{eq. (4)}$$

solving for k, $$k = m^{1/2},$$

then substituting the value of k back into eq. (3), we get:

$$C_{p2} = (2m^{1/2} + 2)C_i. \qquad \text{eq. (5)}$$

Now, since each block switch transistor 601 is in series with a selected column output buffer (transistors 110 or 111), the result is a doubling in the effective resistance R imparted on each associated Vout_S, Vout_R column readout line 500. The doubled resistance impacts doubly on the RC time constant settling time. This doubled resistance may be mathematically represented in terms of a relevant time constant from equations (2) and (3) as:

$$RC_{p2}=2\times(2m^{1/2}+2)*RC_l. \quad \text{eq. (6)}$$

From the above, a parasitic capacitance improvement (or reduction) between $C_{p1}$ (without block switching) and $C_{p2}$ (with block switching) may be expressed as a ratio $C_{p1}:C_{p2}$ as $$m:2m^{1/2}+2, \quad \text{eq. (7)}$$

for large m, $2m^{1/2}+2$, approximates to $2m^{1/2}$, substituting back in eq. (7), we get a ratio of $m:2m^{1/2}$, which equates to a ratio of $m^{1/2}:2$.

Thus, for large m (e.g, 512, 1024, or greater), parasitic capacitance is effectively reduced by a factor of about $m^{1/2}/2$. In a 1024-row architecture having block switching and an optimum block size of 32 ($k=m^{1/2}$), a parasitic capacitance reduction of 16 ($=m^{1/2}/2=32/2$) may be realized over the case where no block switching is utilized.

A similar analysis may be used to determine RC time constant improvement (or reduction) in the cases where there is no block switching ($RC_1$) versus the case where block switching ($RC_2$) is provided.

Representing the two cases by $RC_{p1}:RC_{p2}$, from equations (6) and (7), we get $$m:2\times(2m^{1/2}+2). \quad \text{eq. (8).}$$

Here again, for large m, $2m^{1/2}+2$, approximates to $2m^{1/2}$, substituting back in eq. (8), the ratio can be expressed as $m:4m^{1/2}$, which equates to a ratio of $m^{1/2}:4$.

Thus it is shown that block switching can reduce the effective RC constant by a factor of about $m^{1/2}/4$. Accordingly, for a pixel array of 1024×1024, the parasitic capacitance may be reduced by a factor of 8×2 (=$1024^{1/2}$/4×2), while the RC time constant is reduced by a factor of 8, by utilizing block switching. In a 32 ($1024^{1/2}$) block orientation, each column output stage is imparted an effective loading equivalent to having 1024/16=64 columns connected together.

Figure 7:
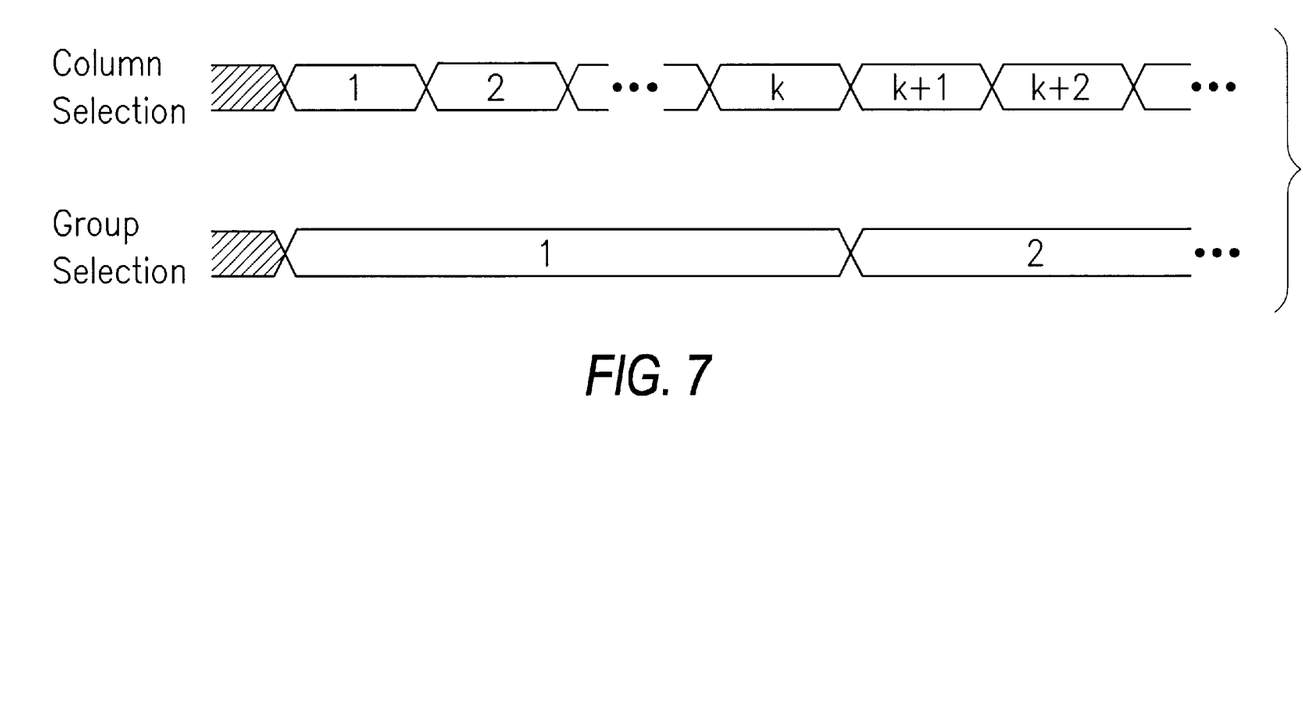
FIG. 7 shows the timing for column readout and column group selection in accordance with a preferred implementation of the present disclosure.

FIG. 7 shows the timing for effecting column selection in block group fashion in accordance with a preferred implementation in which it is contemplated that the column read out circuits 101 in a given block will be readout first. After all the columns in the block have been read out, the associated block switch is disabled, and the block switch associated with the next column readout circuit to be read out is enabled (turned ON).

The present implementation has been described having only one level of block switches. Another embodiment uses multiple levels of cascaded stages of block switching to further reduce the effective parasitic capacitance seen by a selected column output stage.

In summary, the present solution provides a way for reducing the effective load capacitance thereby allowing for an increase in pixel readout rate without any increase in power dissipation. It is contemplated however that the present solution also allows for a way to improve (reduce) power dissipation in applications where a low pixel readout is desirable.

As should be readily apparent from the above discussion of the preferred embodiments, block switching provides additional advantages beyond those in conventional tree-style decoding. A typical tree-style single stage implementation decoding method reduces the effective load capacitance by a factor of 2. For n cascaded stages, the load capacitance is reduced by a factor of $2^n$ at the expense of very high circuit complexity. The non-cascaded system of FIG. 6 with a large image array with a horizontal resolution of 1024 could have its effective capacitance reduced by a factor of 16.

This system can also increase the pixel readout rate (due to faster settling time) without any increase in the biasing current of the column output stages, and without introducing substantial circuit complexity to the overall active pixel sensor column readout architecture.

Although only a few embodiments have been described in detail, those having ordinary skill in the art would certainly understand that many modifications are possible in the preferred embodiment without departing from the teachings thereof. For example, although the block switching is described in terms of "rows", the blocks could be columns or any other shape of blocks.

All such modifications are intended to be encompassed by the following claims.

What is claimed:

1. An image sensor comprising:
    a shared block readout line;
    m blocks, wherein m is a positive integer greater than one and each one of said m blocks comprises:
        k column readout circuits, each of said k column read out circuits for reading out a respective activated image sensor element, said k column readout circuit being commonly coupled to at least one shared block readout line, where k is a positive integer greater than one; and
    m block select switches, wherein each block select switch selectively couples the k column readout circuits of one of said blocks to said shared block readout line.

2. The image sensor of claim 1, wherein said image sensor elements are arranged as a plurality of rows in a pixel array, and for each of said blocks, the column readout circuits read out image sensor elements of an activated row.

3. The image sensor of claim 2, wherein each column readout circuit comprises a column select transistor.

4. The image sensor of claim 2, wherein the relationship between k and m is represented by the equation $k=m^{1/2}$.

5. The image sensor of claim 3, wherein said image sensor comprises a linear array of image sensing elements.

6. The image sensor of claim 3, wherein said image sensor comprises a non-linear array of image sensing elements.

7. The image sensor of claim 2, further comprising at least a first set of super-block select switches arranged in cascade fashion relative to said block select switches to further reduce the parasitic capacitance effects from non-driven signal readout lines.

8. The image sensor of claim 2, wherein said image sensor elements are active pixel sensors, having a CMOS photo sensor, and at least one transistor for buffering, within each pixel.

9. An image sensor, comprising:
    a shared readout line;
    a plurality of readout circuits, said plurality of readout circuit organized into a plurality of blocks, each of said blocks including at least two of said readout circuits, and each of said readout circuits being associated with said shared readout line;
    a plurality of block select switches, for selecting an associated one of said plurality of blocks;
    wherein each of the block select switches
        is enabled only when a pixel signal corresponding to one of said readout circuits in the associated block is to be read out to couple every readout circuit in said associated block to said shared readout line, and is disabled when no pixel signal corresponding to any of said readout circuits in the associated block is to be read out, to decouple every readout circuit in said associated block from said shared readout line.

10. The image sensor of claim 9, further comprising at least a first set of super-block select switches arranged in cascade fashion relative to said block select switches to further reduce the parasitic capacitance effects from non-driven signal readout lines.

11. The image sensor of claim 9, wherein each block readout circuit is associated with a column of the image sensor array, and comprises a column select transistor.

12. The image sensor of claim 9, wherein there are m blocks, where m is a positive integer greater than one, each of said m blocks include k readout circuits, where k is a positive integer greater than one, and a relationship between m and k is expressed by the equation $k=m^{1/2}$.

13. An image sensor device, comprising:

a plurality of signal readout lines, said plurality of signal readout lines arranged in a plurality of blocks, wherein each block includes at least two of said plurality of signal readout lines;

a shared readout line;

a plurality of block select switches, for selecting an associated one of said plurality of blocks;

wherein each of the block select switches is enabled only when a signal driven on one of said signal readout lines in the associated block is to be read out to couple every signal readout line in the associated block to said shared readout line, and is disabled when there is no signal from any of said signal readout lines in the associated block is to be read out.

14. The device of claim 13, wherein there are m blocks, where m is an integer greater than one, each of said m blocks include k readout circuits, where k is an integer greater than one, and a relationship between m and k is expressed by the equation $k=m^{1/2}$.

15. The device of claim 13, further comprising at least a first set of super-block select switches arranged in cascade fashion relative to said block select switches to further reduce the parasitic capacitance effects from non-driven signal readout lines.

16. A method of reducing parasitic capacitance effects in a device having a shared signal readout line, a plurality of signal readout lines including a selected signal readout line, said plurality of signal readout lines organized as a plurality of blocks each associated with at least two of said plurality of signal readout lines, and a plurality of block select switches each for selectively coupling the shared signal readout line to every signal readout line in a selected block from said plurality of blocks, the method comprising:

selecting one of said plurality of blocks as a selected block, wherein said selected block includes said selected signal line; and enabling a block select switch corresponding to the selected block to couple every signal readout line in said selected block to said shared signal readout line; and disabling the block switch corresponding to the selected block after a signal from the selected signal readout line is read out onto the shared signal readout line.

17. The method of claim 16, wherein the disabling of the enabled block switch occurs after all signal readout lines in the selected block having a signal to be read out onto the shared readout line are read out.

18. The method of claim 17, wherein the device further comprises at least a first set of super-block select switches arranged in cascade fashion relative to the block select switches to further reduce the parasitic capacitance effects from non-driven signal readout lines, the method further comprising:

selectively enabling a super-block select switch associated with the selected signal readout line during read out of the signal onto the shared readout line.

19. The method of claim 17, wherein the device is an active pixel sensor and the signal readout lines are associated signal lines from column readout circuits.

20. The method of claim 19, wherein the associated signal lines are a pair of differentiated pixel value signals, Vout_S, Vout R.

21. The method of claim 20, wherein the block select switches are transistors.

22. The method of claim 17, wherein there are m blocks, where m is an integer greater than one each of said m blocks include k readout lines, where k is an integer greater than one, and a relationship between m and k is expressed by the equation $k=m^{1/2}$.

23. The image sensor of claim 9, wherein said readout circuits are active pixels, with a CMOS photo sensor, and an in-pixel buffer transistor.

* * * * *